Feb. 20, 1951     C. L. LEIFER     2,542,089
COLLATING MACHINE
Filed Aug. 30, 1946     12 Sheets-Sheet 1

CHARLES L. LEIFER,
Inventor.
By: [signature]
Attorney

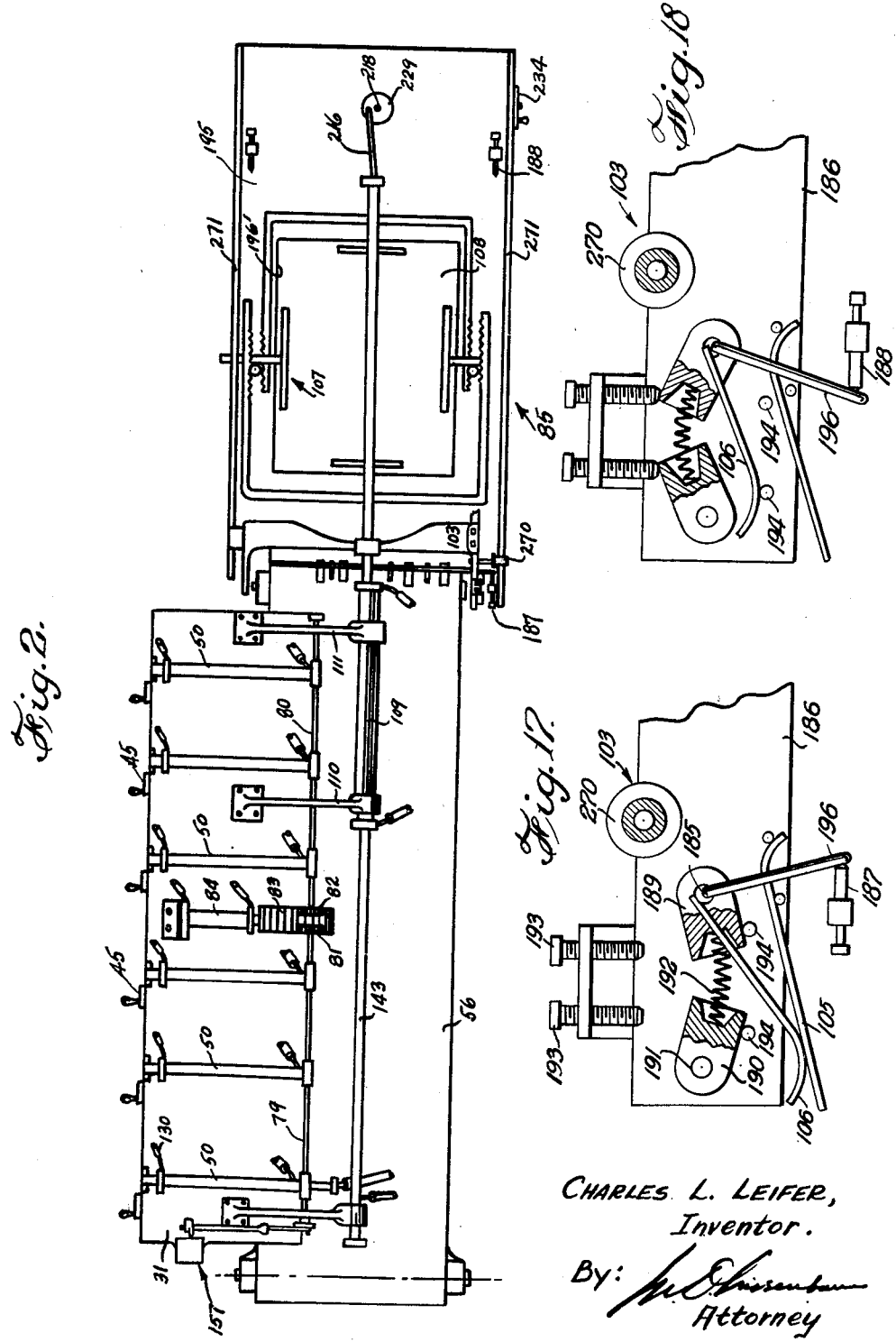

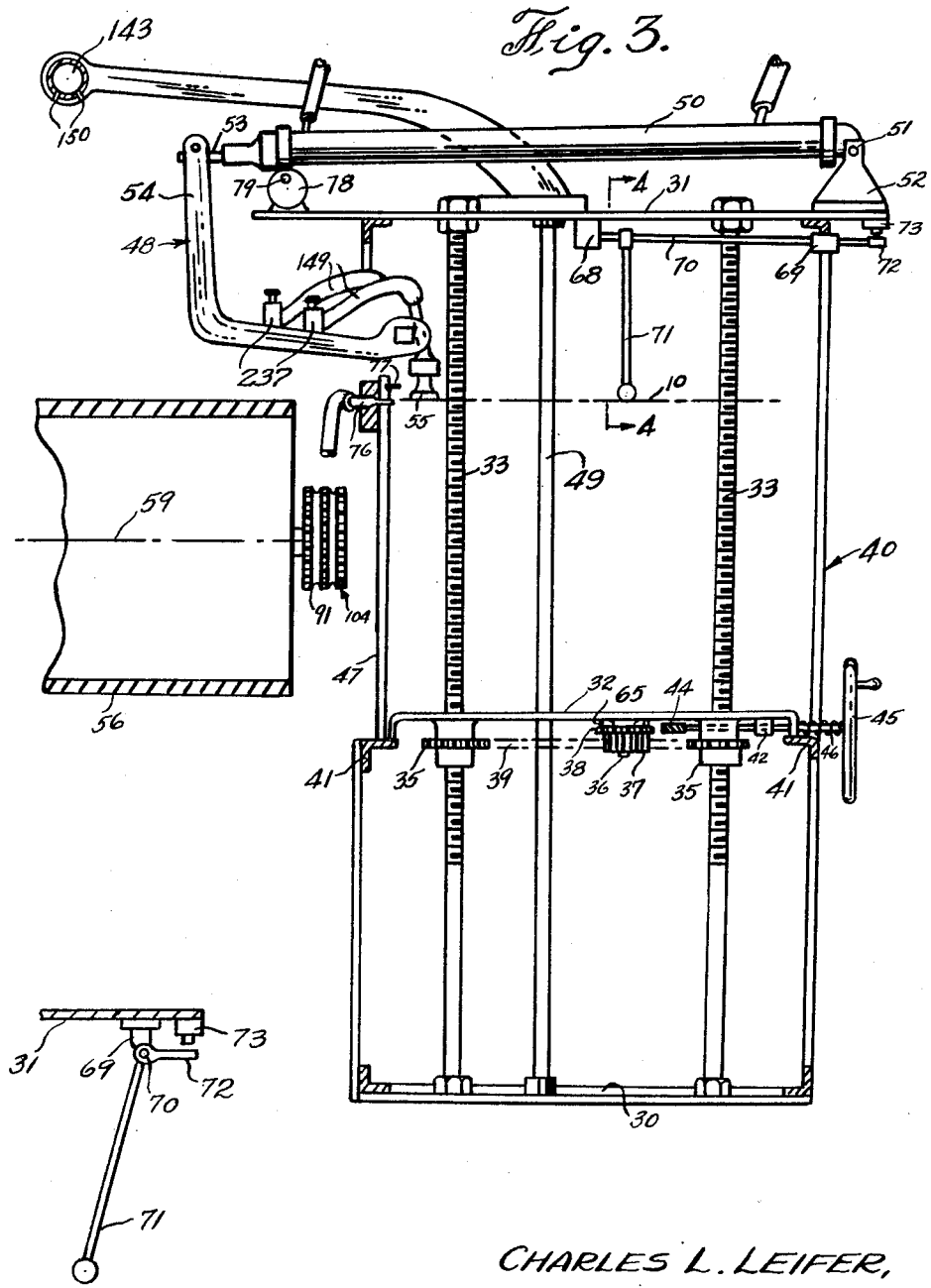

Charles L. Leifer,
Inventor.

By: [signature]
Attorney

Feb. 20, 1951         C. L. LEIFER         2,542,089
COLLATING MACHINE
Filed Aug. 30, 1946                    12 Sheets-Sheet 5

CHARLES L. LEIFER,
Inventor.

By: [signature]
Attorney

Feb. 20, 1951 C. L. LEIFER 2,542,089
COLLATING MACHINE
Filed Aug. 30, 1946 12 Sheets-Sheet 7

CHARLES L. LEIFER,
Inventor.
By: *[signature]*
Attorney

Feb. 20, 1951 C. L. LEIFER 2,542,089
COLLATING MACHINE
Filed Aug. 30, 1946 12 Sheets-Sheet 8

CHARLES L. LEIFER,
Inventor.

By: *[signature]*
Attorney

Feb. 20, 1951     C. L. LEIFER     2,542,089
COLLATING MACHINE

Filed Aug. 30, 1946     12 Sheets-Sheet 9

CHARLES L. LEIFER,
Inventor.

BY: *[signature]*
Attorney

CHARLES L. LEIFER,
Inventor.

CHARLES L. LEIFER,
INVENTOR.
BY
Attorney

CHARLES L. LEIFER,
Inventor.

By: [signature]
Attorney

Patented Feb. 20, 1951

2,542,089

UNITED STATES PATENT OFFICE 2,542,089

COLLATING MACHINE

Charles L. Leifer, New York, N. Y.

Application August 30, 1946, Serial No. 694,049

7 Claims. (Cl. 270—58)

The present invention relates to collating machines and more particularly to the type wherein from a plurality of piles of sheets of paper or the like, individual sheets therefrom are arranged in predetermined sequence in superposed relation to form a set, and wherein a plurality of such sets are arranged in superposed relation to form a single pile.

An object of this invention is to provide a novel and improved collating machine of the character mentioned, wherein transportation of the individual sheets to form sets, and transportation of such sets to form a single pile, is accomplished principally by pneumatically operated devices; affording easy functional adjustment and exceptional speed and economy of operation.

Another object hereof is to provide a novel and improved collating machine of the type described, wherein the sheets next to be transported to set forming position, are automatically maintained in a predetermined plane to insure their proper reception by the sheet transporting means.

A further object of this invention is to provide a novel and improved collating machine of the type mentioned, wherein the individual sets of sheets are built up by a novel and improved procedure.

Another object hereof is to provide a collating machine of the kind set forth, of novel and improved construction wherein sheet positioning and aligning is accomplished and in several instances aided by means having a novel mode of operation.

Another object of the present invention is to provide a collating machine of the character described, of novel and improved construction, wherein at predetermined intervals in the final pile, are sheets of cardboard; thus facilitating pad manufacture. Also if desired, the frequency of cardboard sheet occurence in said final pile is adjustable, so that for instance in the final pile, there are 25, 50, 75 or say 100 sets of paper sheets above each cardboard sheet.

A further object hereof is to provide a novel and improved collating machine wherein by simple adjustment, it is made adaptable for building a single pile of identical sets of sheets; each set comprising any predetermined number of sheets within the maximum capacity of the machine.

Another object of this invention is to provide a novel and improved collating machine of the type described, wherein each of the sheet transporting devices are independently adjustable to operate effectively where the sheets comprising the initial piles are of different nature respectively, as for instance cardboard, 20 lb. paper, carbon paper, sheets of tissue paper and so on.

Still a further object hereof is to provide a collating machine of the character mentioned which is fully automatic in its operation and efficient in carrying out the purposes for which it is designed.

Other objects and advantages will become apparent as this disclosure proceeds.

In the accompanying drawings forming part of this application, similar characters of reference indicate corresponding parts in all the views.

Fig. 1 is a diagrammatic view of a collating machine embodying the teachings of this invention. This view is shown partly in section and with various components omitted to attain clarity of illustration. This chosen embodiment includes a six bin structure along which is an intermittently moving conveyor belt. Each bin has a platform therein to hold a pile of sheets thereon; said platforms being independently adapted to move upward automatically to maintain the respective top sheets of the paper piles at a required level. Sheet transporting means carry individual sheets from the respective piles onto the conveyor belt and collation of said sheets is effected as hereinafter explained. Also provided are means to carry the sets of collated sheets from off the conveyor belt to a single final pile. Various other mechanisms are provided, as for instance a jogger means to effect a proper final pile and a means to lower the final pile platform as the pile thereon grows. All mechanism mentioned are shown in this view in accordance with the practice of this invention, as well as other means to be described. The six bin structure here shown, is to be deemed a mere example, for machines having any practical number of bins may be constructed as requirements may dictate.

Fig. 2 is a top view of Fig. 1.

Fig. 3 is a partial section taken at line 3—3 in Fig. 1, showing in particular the interior of a bin, the conveyor belt which is to receive sheets thereon from the pile resting on the platform within said bin, and the means for transporting the top sheet of the bin pile onto said conveyor belt. Various associated mechanisms and components are also shown and will be explained in this specification.

Fig. 4 is a fragmentary section taken at line 4—4 in Fig. 3, showing part of the means used to accomplish the automatic raising of the bin platform.

Figures 7, 8:
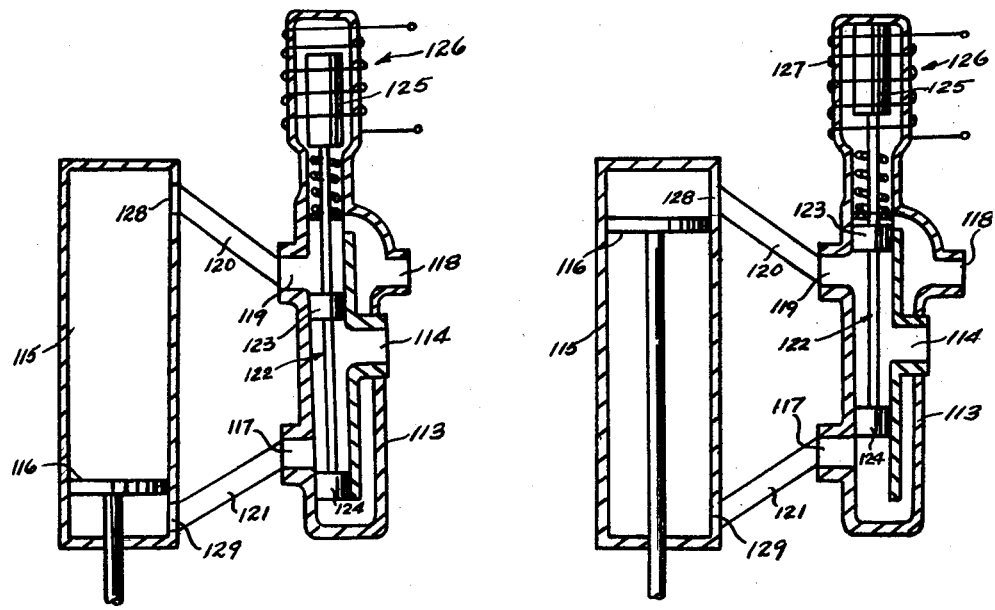

Fig. 7 is a sectional view through a solenoid-controlled valve associated with a double acting air cylinder having a slidable piston therein, the motion of which is used to operate various parts of this machine which require a reciprocatory motion, as for instance the means used herein to transport sheets from the bins onto the delivery belt, the means employed to carry a pile of collated sheets from off the delivery belt onto the final pile, and others as hereinafter described. This view shows one type of such valve, with its components in position to allow a supply of compressed air to be fed to the underside of the piston in the air cylinder.

Fig. 8 is a similar view showing valve components in position they assume upon actuation of the solenoid. Here, compressed air is allowed to flow against the face of the piston in the air cylinder.

Figure 9:
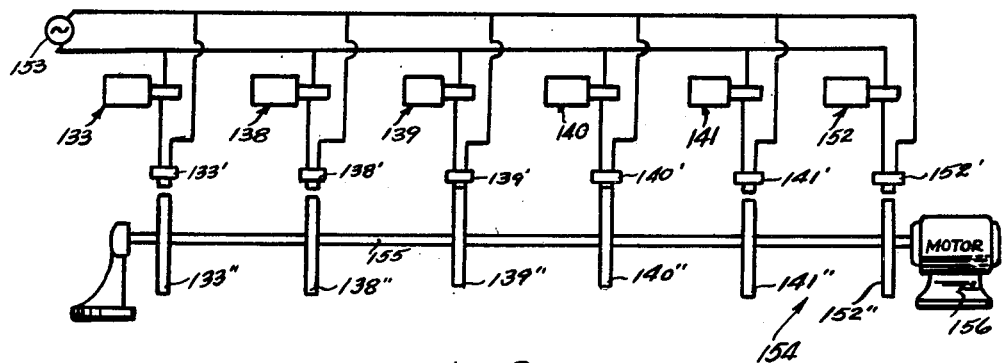

Fig. 9 is a diagrammatic view showing the electrical wiring diagram and the timer means used herein for the control and operation of the various solenoid-operated valves included in this embodiment of the present invention.

Figure 10:
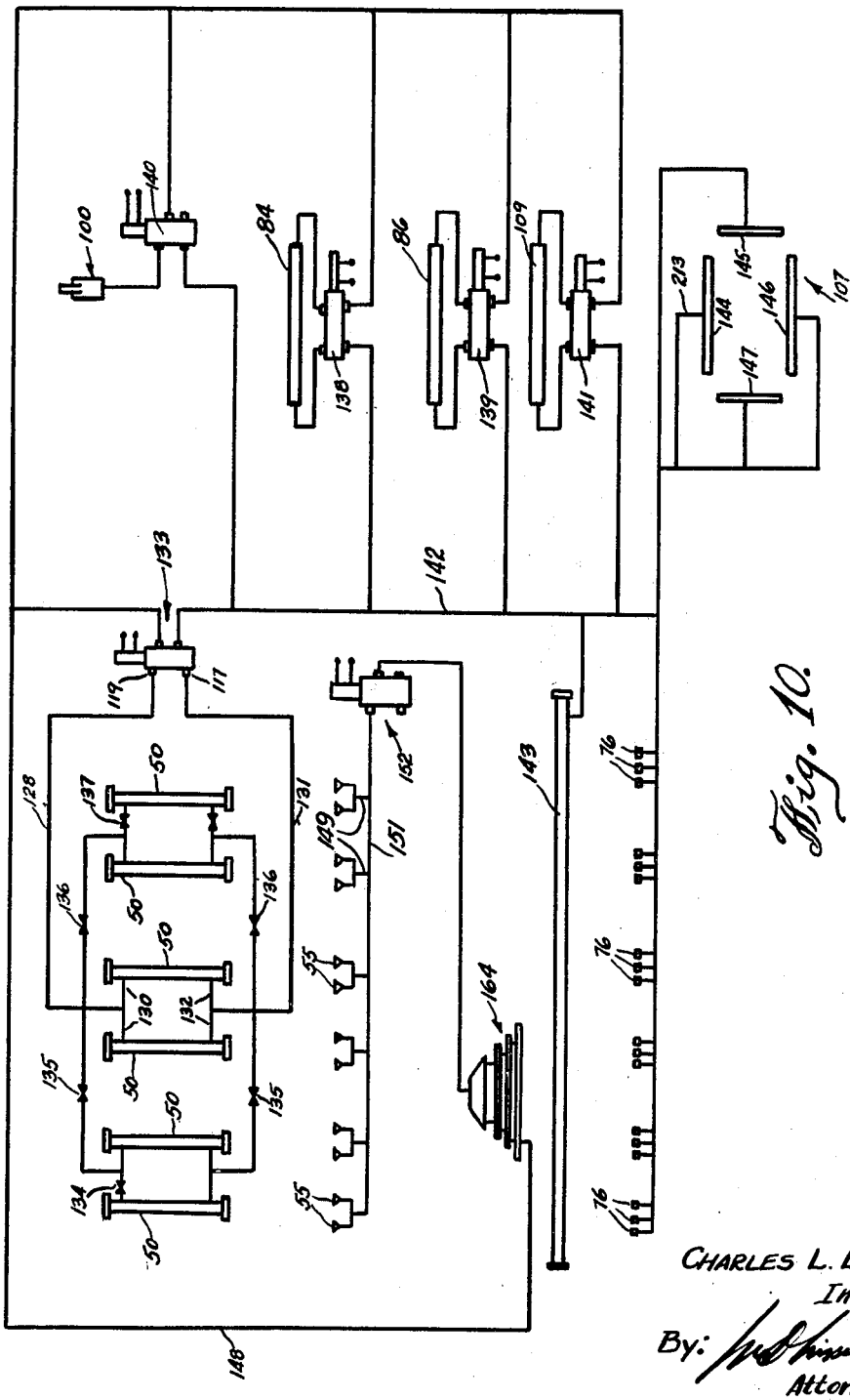

Fig. 10 is a schematic view of the piping system for the various means employing air to function or operate, included in this embodiment.

Figure 11:
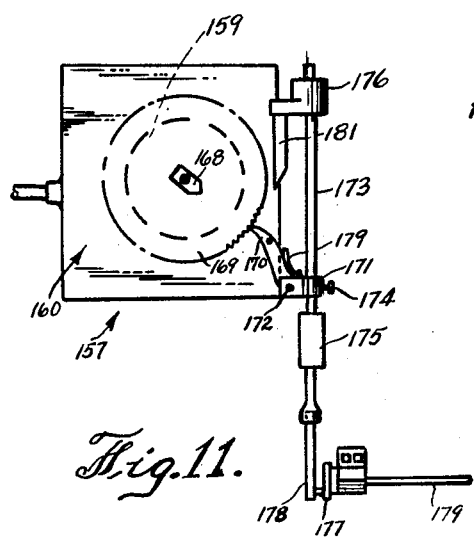

Fig. 11 is a top view of a form of valve and associated operating means which may be used when it is desired for instance to interpose a cardboard sheet to be positioned at predetermined positions in the final pile, let's say every one hundred or every fifty sets of collated sheets, for example. Such means includes a ratchet and pawl here shown in position where the pawl commences engagement of the ratchet wheel.

Figure 12:
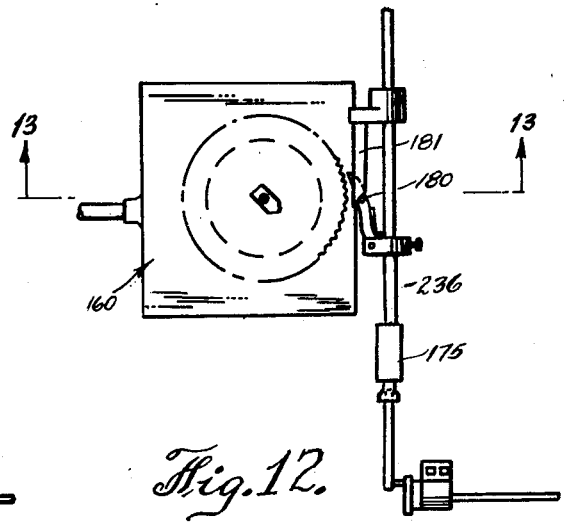

Fig. 12 is a similar view showing the position of the various components where the pawl has completed turning the ratchet wheel a predetermined amount, and said pawl is ready to be returned to initial position.

Figure 13:
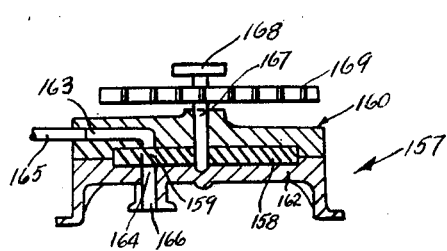

Fig. 13 is a partial sectional view taken at line 13—13 in Fig. 12.

Figure 14:
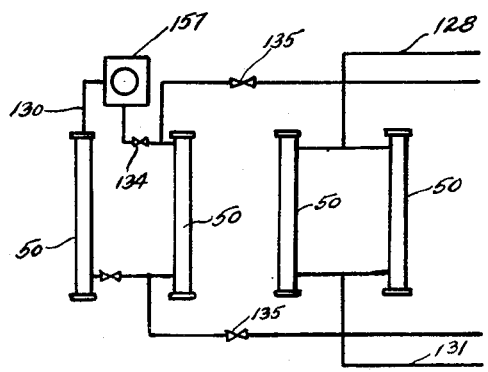

Fig. 14 shows a fragmentary view of the piping system illustrated in Fig. 10, with the valve of Fig. 11 interposed therein.

Figure 1:
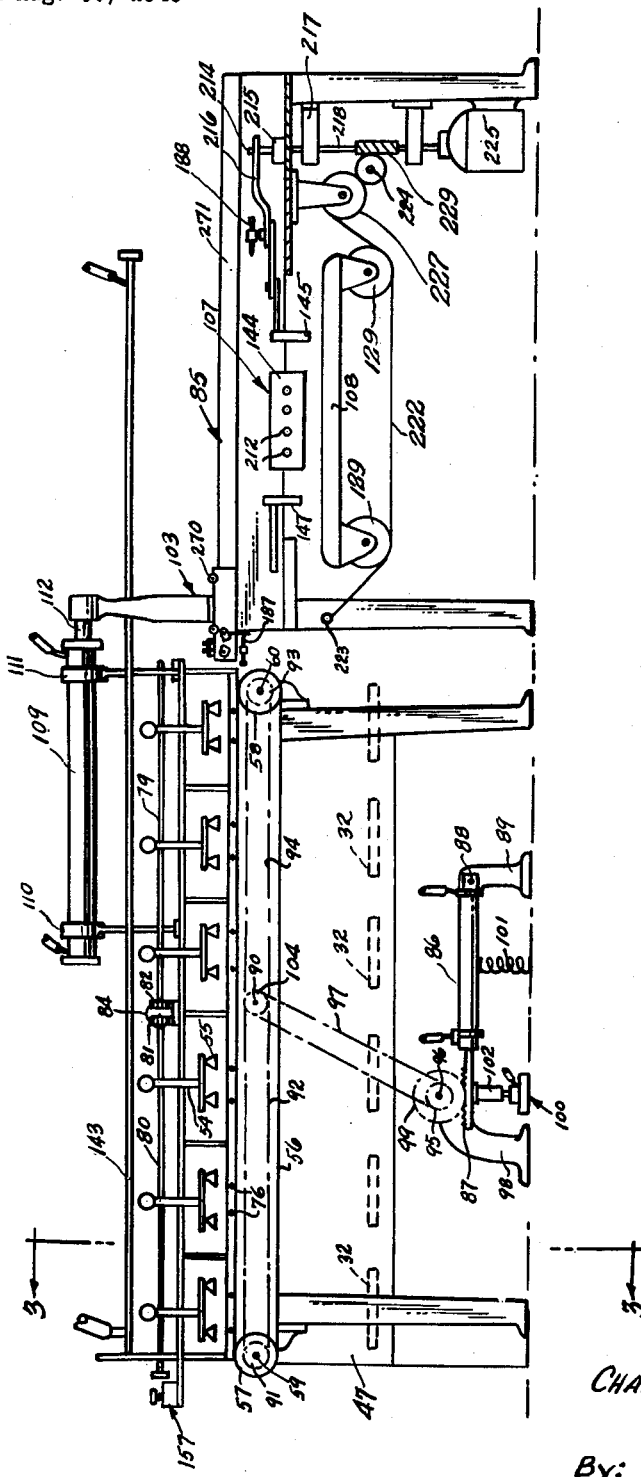
Figure 5:
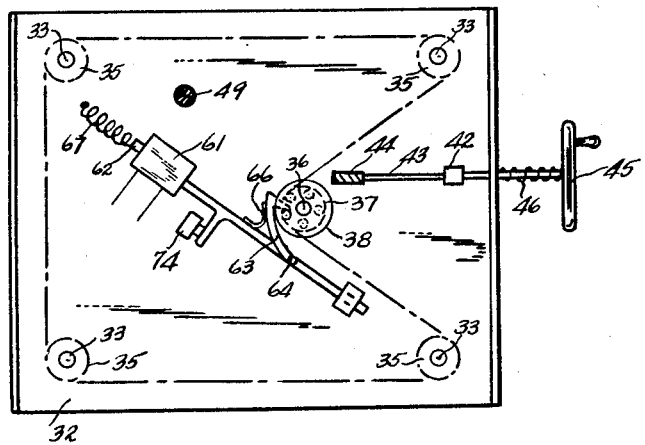
Fig. 5 is a bottom view of any of the bin platforms and particularly shows another part of the automatic platform-raising means as well as means to manually move the platform.
Figure 15:
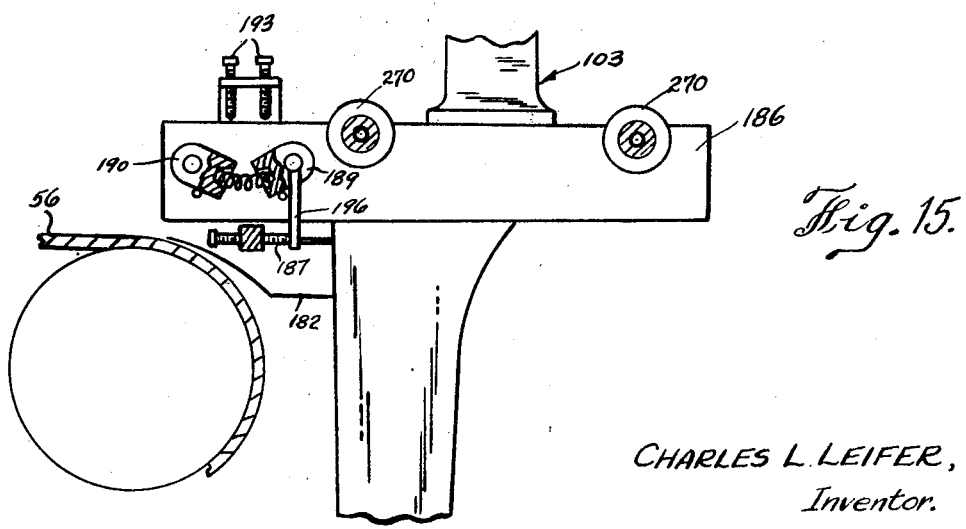

Fig. 15 is a fragmentary view showing part of Fig. 1, and particularly showing a portion of the delivery carriage which transports piles of collated sheets from off the delivery belt to the final pile.

Figure 16:
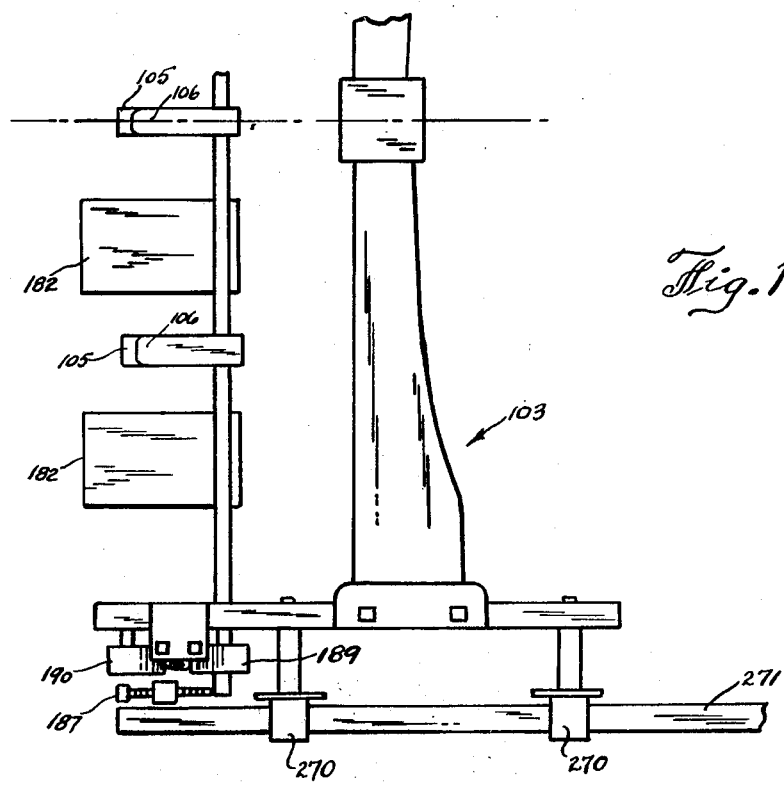

Fig. 16 is a top view of Fig. 15.

Fig. 17 is an enlarged view of part of Fig. 15, showing in particular the fingers and associated operating means therefor, on the delivery carriage, which fingers receive a pile of collated sheets from the delivery belt, after such pile is completed and upon ensuing movement of said delivery belt which carries said pile of collated sheets to said fingers. The fingers are here shown closed or in gripping position.

Fig. 18 is a similar view showing said fingers in open position, which they assume upon movement of the carriage away from the delivery belt and over an opening in the delivery table, at which place the pile of collated sheets said fingers have held and transported, are let drop through a jogger device and thence onto the final pile.

Figure 19:
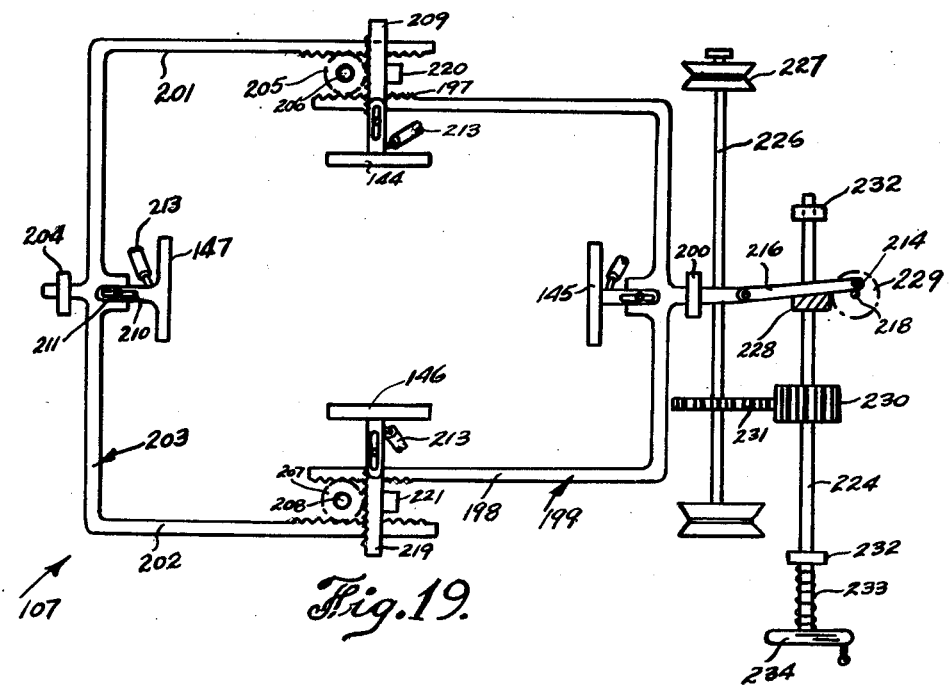

Fig. 19 is a diagrammatic plan view of such jogging means. Also here shown is means for manually raising or lowering the final pile platform.

Figure 20:
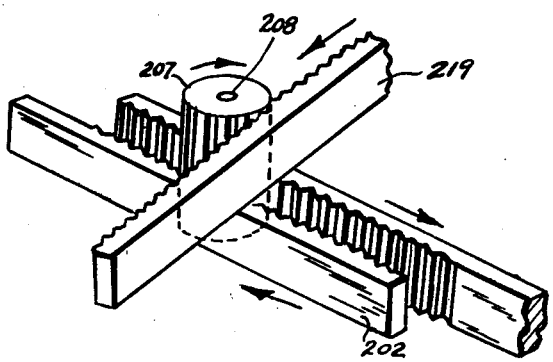

Fig. 20, is an enlarged fragmentary perspective view of associated jogger components.

Figure 21:
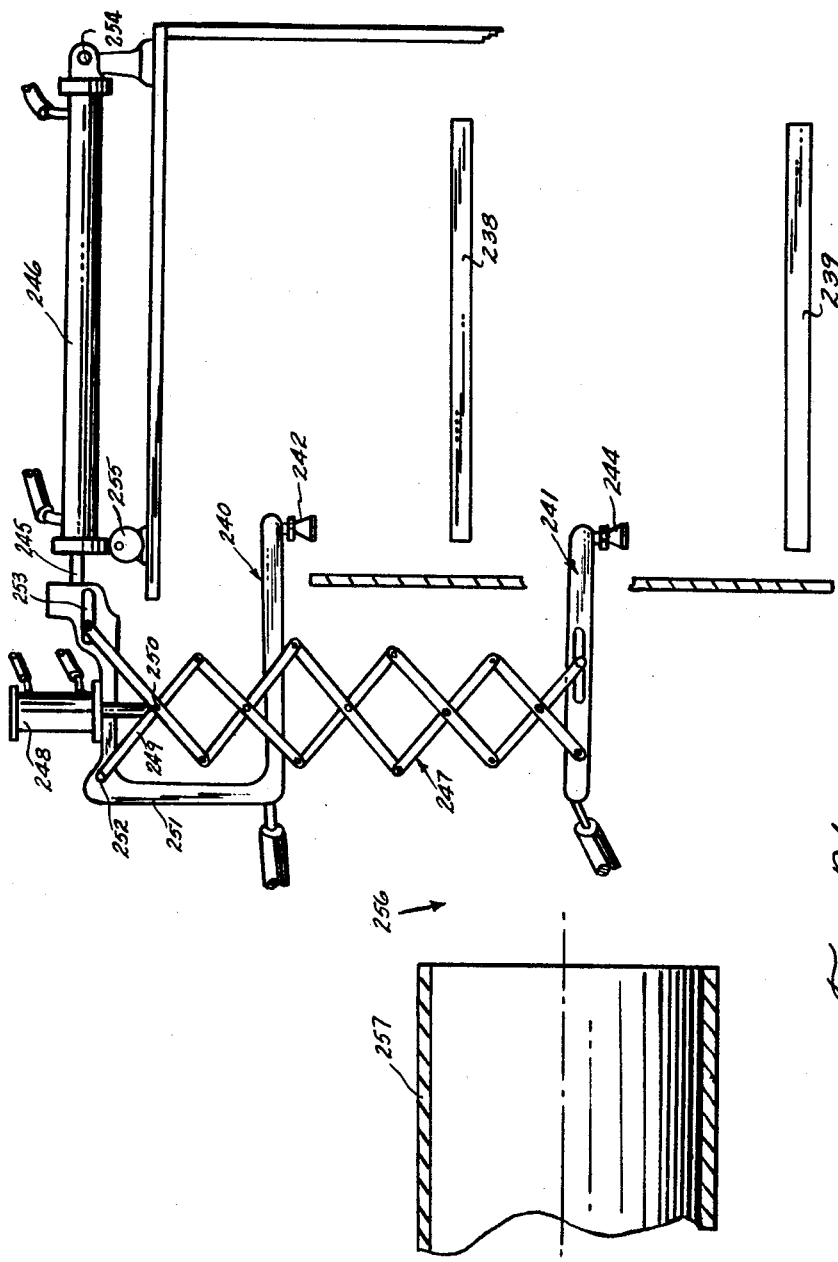

Fig. 21, is a view akin to Fig. 3, and shows diagrammatically a modified embodiment where from off two sheet piles, resting on separate platforms which are one over the other in a bin, the top sheets are transported by means shown here, to lie in register on the delivery belt. This structure may be employed as to one or more bins of the machine of Fig. 1.

Figure 22:
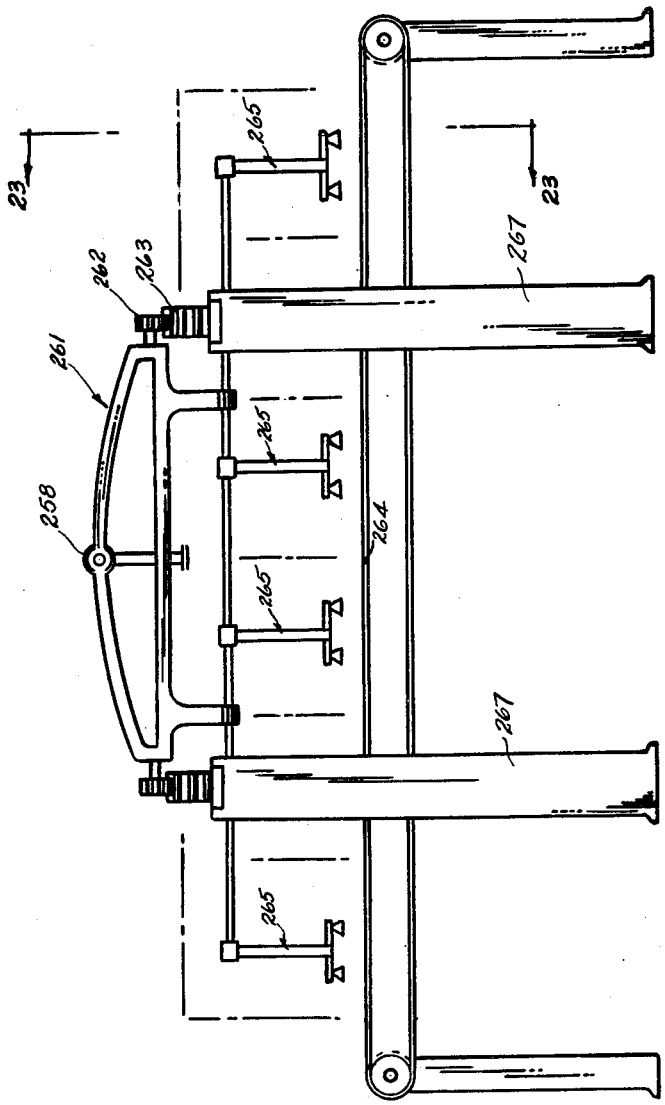

Fig. 22 is a diagrammatic front view of the bin structure provided with a modified embodiment of the means used to impart the required movement for the individual-sheet transporting means.

Figure 23:
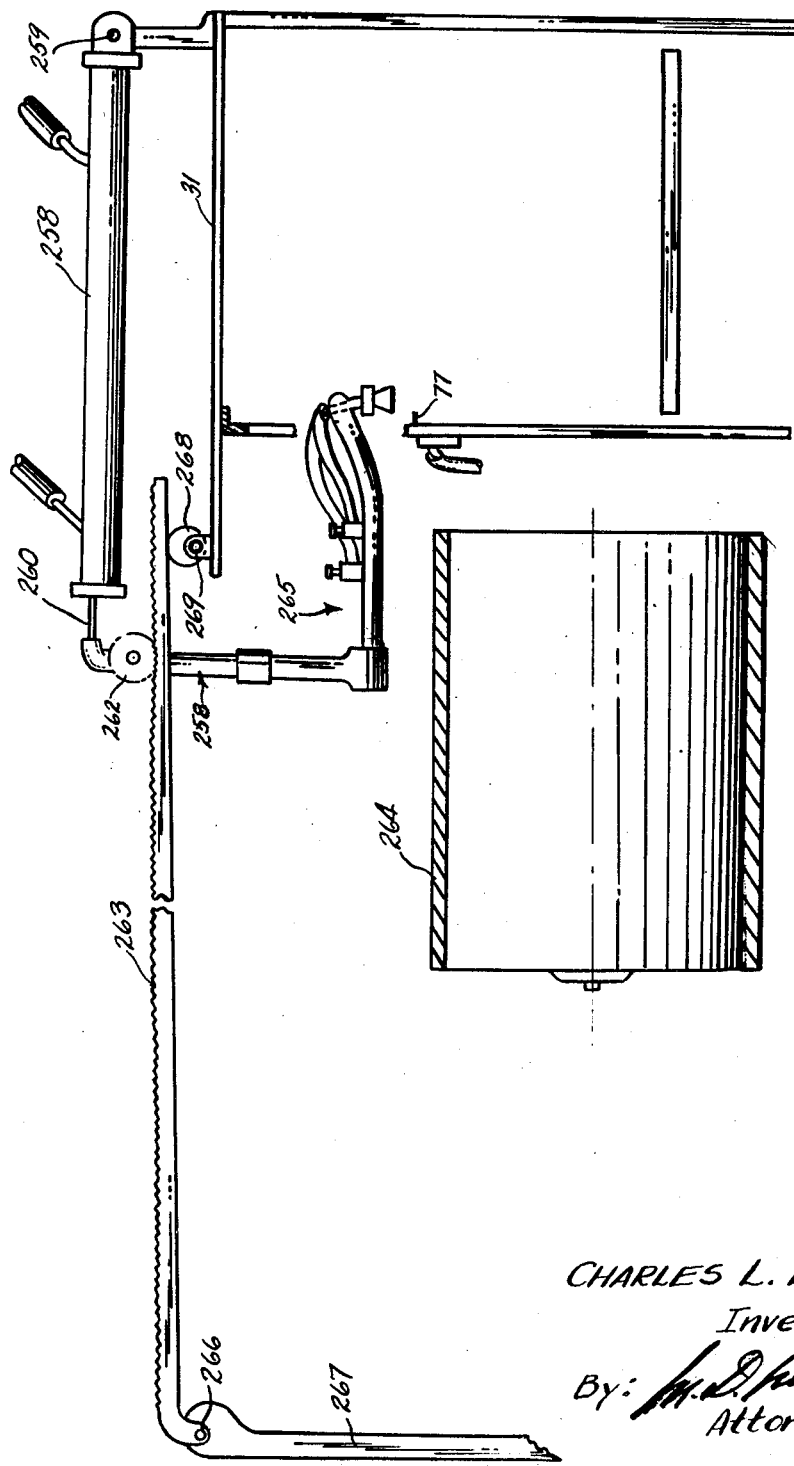

Fig. 23 is a view akin to Fig. 3, and is a partial section taken at line 23—23 in Fig. 22.

In the drawings, showing a preferred embodiment of this invention, the numerals 30 and 31 (see Fig. 3) indicate plates which serve as the floor and ceiling respectively of that part of the machine usually referred to as the bins. In each such bin, is a horizontally positioned platform 32, loosely mounted for vertical movement along the stationary, vertically positioned screw shafts 33, whose ends are secured to said floor and ceiling plates in any suitable manner. The bins being shown in tandem, platforms 32 may be rectangular with a screw shaft 33 through each vertex region respectively. Each platform 32 will therefore ride along a group of four screw shafts 33.

Mechanism (see Figs. 3, 4, 5 and 6) associated with each of the platforms 32 being identical, description therefor as to one, shall be deemed to apply to all.

Every screw shaft 33, (see Figs. 3 and 5) carries revolvably threadedly engaged thereon, a sprocket 35, positioned immediately below the platform 32, so as to act as a rest therefor. On the underside of platform 32, is a revolvably mounted shaft 36, which carries thereon turnable therewith, a sprocket 37 and a gear wheel 38. An endless sprocket chain 39, is engagingly mounted on all the five sprockets, so that upon rotary movement of shaft 36, the sprockets 35 will ride along their respective screw shafts 33, whereby platform 32 is raised or lowered in the bin structure which is of angle iron frame work 40, connecting the floor and ceiling plates 30 and 31. Cross pieces 41 of said frame work, may act as stop means to limit the downward movement of the platform 32.

Slidably mounted through the bracket 42 on the underside of platform 32, is a shaft 43 carrying a worm 44 on its inner end and a handwheel 45 on its outer end. A spring 46 on shaft 43 between said handwheel and bracket, serves to maintain the worm 44 out of engagement with the gear wheel 38. It is evident that by pushing the handwheel 45, the worm 44 will be brought into engagement with gear wheel 38, whereby platform 32 may be manually moved when required, by turning the handwheel 45. Upon release of hold on said handwheel, action of stressed spring 46 will shift the worm 44 out of engagement from gear wheel 38.

At the rear of the machine (see Fig. 3) above the cross pieces 41, free access is had to load the platform 32, with a pile of sheets laid flat thereon; the forward edges of said sheets to be up against a vertically positioned plate 47 across the front of the bins. The upper edge of said plate 47 is sufficiently below the ceiling plate 31, to permit the entry and proper actuation within the bin, of a sheet transporting means indicated generally by the numeral 48. The vertically positioned bar 49 serves as a gauge means against which the side edges of the sheets comprising said pile are to rest.

One for each bin, (see Fig. 3) atop the ceiling plate 31, is an air cylinder 50, of the double action type, extending forwardly from the rear of the machine where said cylinder is swingably mounted at 51 which is a horizontal axis pin through the bracket 52. On the forward end of the piston rod or ram 53 of said air cylinder 50, is rigidly secured a depending bracket 54, which preferably carries a plurality of sucker cups 55 of rubber or other suitable material, the mouths of which cups are co-planar and face downwardly. When said piston rod 53 is furthest within the cylinder 50, said sucker cups 55 are within the bin and intended for contacting the top sheet of the pile on the bin platform 32. The top of said pile must be at a level as to permit such contact. Such required level, may be termed bin paper level 10.

As hereinafter explained, operation of the air cylinders 50, so that their rams 53 travel a complete forward stroke, is intended to cause the transportation of the top sheets off all piles on the bin platforms 32, onto a delivery platform, which in the embodiment shown (see Figs. 1 and 3) is an endless belt 56, mounted on the pulleys 57 and 58, which pulleys are on the horizontal shafts 59 and 60 respectively; said belt being positioned in front of and spanning all of the bins. It is advisable that the level of the top surface of the belt 56, be substantially at bin paper level.

To maintain the position of the bin paper piles so that the top sheet of each of said piles is in a plane within the range of lifting power of the sucker cups 55, the position of the respective platforms 32 along the vertical, is automatically controlled by a means now to be described, associated with each of the platforms 32.

On the underside of platform 32 (see Fig. 5), is also mounted a solenoid 61, whose slidable armature 62, pivotally carries a pawl 63 at 64, for engagement with any suitable pin gear or the usual ratchet wheel 65, secured on shaft 36. The numeral 66 designates a spring acting against pawl 63. When the coil of solenoid 61 is energized, its armature 62 is adapted to move in a direction whereby pawl 63 will engage gear 65 to slightly turn shaft 36. Upon deactivating the solenoid 61, a spring 67 will cause the return of said armature to initial rest position. The direction of rotation of shaft 36 effected by said pawl operation, is such as will move sprockets 35 upwardly on the screw shafts 33, thereby raising platform 32 slightly; the threads of said screw shafts being fine.

Depending from the ceiling plate 31 (see Figs. 3 and 4) are the brackets 68 and 69 which carry a horizontally positioned revolvable shaft 70, having an arm 71 extending radially downwardly therefrom to rest tilted with respect to the vertical, atop the bin sheet pile. Said shaft 70 also carries an element 72 radially therefrom, adapted to close a micro-switch 73 due to rotary movement of shaft 70, when the feeler arm 71 moves slightly towards the vertical due to the lowering of the level of the bin sheet pile by a sheet or two or other predetermined number, in excess of which the top sheet of such pile would be out of lifting range of the sucker cups 55. A second micro-switch 74 which is on the underside of platform 32, is normally in closed condition when the solenoid 61 is inactive, but opens upon completion of the engagement action of pawl 63 on gear 65. The switches 73 and 74 (see Fig. 6) and the coil of solenoid 61 are connected in electrical series in a circuit including a source of electrical energy 75.

When the bin sheet pile is at the required bin paper level, feeler arm 71 will be in such position that switch 73 is in open condition. As soon however as the level of said sheet pile has fallen a predetermined number of sheets, said feeler arm 71 will have swung sufficiently due to the action of gravity to cause shaft 70 to turn a bit so that element 72 will cause the closing of switch 73, whereupon the solenoid 61 is actuated and platform 32 slightly raised as explained; switch 74 being now in open condition, the solenoid coil is deenergized and armature 62 will return to initial rest position due to action of spring 67, whereupon said switch 74 will again resume its closed condition. If switch 73 is still closed at this time, the action will be repeated until bin paper level is restored, that is until the feeler arm is again in such tilted position whereby switch 73 is open.

To insure the removal of but a single sheet at a time from off the bin paper pile by the sucker cups 55 (see Figs. 1 and 3), a plurality of nozzles 76 are provided, positioned through plate 47, at and along bin paper level. Also, springy stripper fingers mounted on said plate 47 and extending slightly inwardly over the pin paper level, are there to cause edge contact interception of the uppermost sheets of the bin sheet pile. The inclusion of such nozzles 76 and fingers 77, require that the top edge of plate 47 be above the bin paper level and hence necessitates the lifting and lowering of the sucker cups' bracket 54, which movement is accomplished by means of cams 78 on the shafts 79 and 80; one such cam controlling the swinging of an air cylinder 50 about pivotal connection 51. These cam shafts 79 and 80 (see Figs. 1 and 2) carry respectively the gears 81 and 82, which are in engagement with rack 83 on ram of an air cylinder 84 of the double action type, mounted on ceiling plate 31. Upon operation of said air cylinder 84, the cam shafts 79 and 80 will oscillate, causing the air cylinders 50 to be lifted and lowered, and consequently the sucker cups 55 will have similar movement, which will be timed so that said cups clear the top edge of the plate 47 as is required of them in their travel. Of course all functions of said plate 47 may be by other suitable structural means attached to and properly deemed as part of the bin framework.

The belt 56, has imparted to it an intermittent movement whereby sheets deposited thereon are brought towards the stacking and delivery table indicated generally by the numeral 85. Such belt movement (see Fig. 1) is accomplished by means of a double acting air cylinder 86, having a rack ram 87, and pivotally mounted at 88 onto a fixed bracket 89. A turnable mounted shaft 90, carries thereon a triple sprocket 104, the first of which with the sprocket 91 on shaft 59, carry in engagement the endless sprocket chain belt 92. The second of said sprockets together with a sprocket 93 on shaft 60, carry the belt 94, and the third, together with the sprocket 95 on shaft 96, carry the endless belt 97. Shaft 96 is on a fixed bracket 98. Shaft 96 also carries secured thereon a gear 99, adapted for engagement with rack 87, when cylinder 86 is swung and maintained upwardly at a predetermined level by a double acting air cylinder or a pneumatically operated jack 100. A spring 101 serves to maintain the cylinder 86 downward, when rack 87 is to be out of engagement with gear 99, when the pack head 102 is downward.

It is to be noted (see Figs. 3 and 5) that all sheets of all the bin sheet piles are of identical size; adjustment for sheet size being made by adjusting the position of the bars 49, provision for which is not shown. Also, the positions on the belt 56, (see Fig. 2) where sheets from the bins are transported thereon, shall be such that the sheets from the respective bins lie equispaced on said delivery belt 56, so that upon the periodic advance of said belt, sheets forthcoming from the bins, shall be deposited directly atop already deposited sheets at the respective depositing positions on said belt. The machine is so dimensioned as to effect these conditions.

As the belt 56 progresses along the bins, equispaced sets of sheets are formed thereon. Finally each such set of sheets is carried from the belt 56, by fingers 105 and 106, (see Fig. 16) which are on a carriage 103, (see Fig. 1) and let fall through a jogging device 107, (see Fig. 19) and onto a platform 108 (see Fig. 1) provided with pulley wheels 129, swivelled to the underside of said platform. Movement of the carriage 103 is accomplished by operation of a double action air cylinder 109 mounted on brackets 110 and 111 extending from the ceiling plate 31; said carriage 103 being secured to the ram 112 of air cylinder 109, and riding on wheels 270, along rails 271.

Solenoid operated valves which may be of the type illustrated in Fig. 7, are utilized to control the operation of the air cylinders 50, 84, 86, 100 and 109, in a piping system as for example is shown in Fig. 10, and solenoid operation, time controlled by an electro-mechanical system as for example illustrated in Fig. 9. These systems are of course suggestive, and are to be modified depending upon the number of bins any machine in accordance with this invention is made to include. These systems particularly herein described show one way for controlling a six bin machine, which is the chosen embodiment of this invention set forth in this application.

In the valve device shown, (see Figs. 7 and 8) 113 is its casing having an inlet port 114 for compressed air to be fed cylinder 115, which cylinder and its associated piston 116 is similar to any herein mentioned. The numeral 118 indicates the exhaust port, the numerals 117 and 119 designate the ports to be connected by piping 120 and 121 to the respective ends of the air cylinder 115, and 122 is the slidable piston valve member, having the port controlling members 123 and 124. Said piston 122 is attached to the armature 125 of the solenoid 126, of which 127 is the coil to be electrically energized.

With components in position as shown in Fig. 7, compressed air entering through the inlet port 114, will pass through port 117, and then through pipe 121 into cylinder 115 to act against the piston 116, causing same to move up to cylinder port 128; the solenoid 126 being de-energized. During such piston movement, any air within the cylinder will be forced out through pipe 120, into the valve casing 113 and out through the exhaust port 118. Now, upon energizing the coil 127 of the solenoid, armature 125 and hence the valve piston 122 will be moved to position shown in Fig. 8. With components now in position as shown in said latter figure, compressed air entering through the inlet port 117, will pass through port 119, and then through pipe 120 into the cylinder 115 to act against the other side of piston 116, causing same to move to cylinder port 129. During such movement, any air formerly within the cylinder 115, will be forced out through pipe 121, into the valve casing 113 and out through the exhaust port 118. Solenoid coil 117 is now de-energized and the cycle repeated to obtain continuous reciprocation of the piston 116.

Of course, operation of cylinder 86 (see Fig. 1) to move the delivery belt 56 one bin position, occurs after a sheet from each of the bin sheet piles has been deposited on said belt. For efficient working, the cylinders 50 (see Fig. 3) are identically operated simultaneously. To adapt the machine so that any desired number of bins may be "worked," separate cylinders 50 for each bin are provided. It is of course evident that where selectivity as to capacity is not required, as where a machine is always to have a single number of bins, one or any number of cylinders 50 may be employed to operate the sheet transporting apparatus which deposits sheets onto the delivery belt 56.

In the piping system shown in Fig. 10, the rear ends of all the air cylinders 50, are connected to a pipe or tube 128 by the tubing or hose 130, while the forward ends of said air cylinders are connected to a pipe or tube 131 by the tubing 132. Hose 128 is connected to port 119, and hose 131 is connected to port 117 of a solenoid operated valve of the type described and designated generally by the numeral 133. In the arrangement specifically illustrated, hand set valves 134, 135, 136 and 137 may be included or interposed where shown, to enable choosing which of the air cylinders 50 shall be operated. When valves 134 are set closed, the air cylinder 50 at the extreme left is maintained inactive. When valves 137 are set closed, the air cylinder 50 at the extreme right is maintained inactive. When valves 135 are set closed, the two air cylinders 50 at the extreme left are maintained inactive, and when valves 136 are set closed, the two air cylinders at the extreme right are maintained inactive. Since collating of two sheets is the minimum the machine is called upon to perform, the middle two air cylinders 50 are shown connected for operation. The air cylinders 84, 86, 100 and 109, are respectively controlled by the solenoid controlled valves 138, 139, 140 and 141 respectively. All the exhaust ports of all valves 133, 138, 139, 140 and 141 are connected to a common hose or pipe line 142, which leads to an overhead pipe 143, having the downwardly discharging nozzles 150, all along its length over the delivery belt 56 and the stacking and delivery table 85. Also pipe line 142 is connected to the plurality of blower nozzles 76, and to the blower nozzles 153 for issuing an air gust between the jogger plates 144, 145, 146 and 147. The intake ports of all the solenoid controlled valves 138, 139, 140, 141 and 133 are connected to a supply of compressed air 148. The hose 149 leading from the sucker cups 55, are all connected to a hose line 151 from and into cylinder discharge port of a solenoid controlled valve 152 which is of the type described herein. The exhaust port of such valve 152 leads to the intake port of an air compressor 164 which may be used to furnish the supply to 148.

The solenoid coils (see Fig. 9) of all the valves 133, 138, 139, 140, 141 and 152, are in electrical parallel connection in a circuit energized by an electrical energy source 153. In series electrical connection with each of said respective coils is a button switch for instance, in each coil branch of said circuit. It is evident that switch 133′ is for the control of the solenoid of valve 133, and each of the other switches respectively numbered prime is for the control of the respective solenoid controlled valves of similar number without the prime.

A timer mechanism (see Fig. 9) indicated generally by the numeral 154 for controlling switch operation, consists for example, of a shaft 155 turned by motor 156. Said shaft carries an individual cam for co-operation with said button switches, respectively. The respective cams bear designating numerals each double prime to correspond to the numerals designating their related switches. Said plurality of cams are so designed and relatively positioned on shaft 155 as to accomplish operation of the several air cylinders in proper timed relation and direction of piston movement as is necessary, by proper timed control of solenoid operation.

This machine can be adapted to deposit a cardboard sheet between a predetermined number of sets of collated paper sheets, with provision, if desired, to change such number by means of a simple adjustment, to facilitate the manufacture of pads of collated sheets. For such function, in pipe line 130 which is connected to the rear end of air cylinder 50, at the extreme left of Fig. 1, is interposed a valve means indicated geenrally by the numeral 157.

Referring to Fig. 13, said valve means 157, comprises a disc rotor member 158, having an opening 159 through its body. Said rotor member is rotatably mounted in a valve casing 160 between the walls 161 and 162, having the holes or openings 163 and 164 therethrough respectively in register. Rotation of disc 158, brings its opening 159 in register with both the openings 163 and 164, bringing said valve 157 into open condition. Openings 163 and 164 are communicative with the valve ports 165 and 166 respectively, for connection within hose 130 of said first air cylinder 50 at the left of the machine.

The rotor shaft 167 of this valve (see Figs. 5, 11 and 12), carries a handle 168 and a ratchet wheel 169, whose associated pawl 170 is pivotally carried on a collar 171 at 172. The position of this collar along shaft 173, is adjustable by means of a set screw 174. Shaft or rod 173 is slidably mounted through fixed brackets 175 and 176, and is reciprocated by a crank 177 on, or driven from the cam shaft 179, through a connecting rod 178. A blade spring on collar 171, numbered 179, serves to press the pawl 170 towards the ratchet wheel 169, while pin 180, extending from the pawl is adapted to be engaged cam-like by the fixed member 181, whereby pawl 170 is disengaged from the ratchet wheel 169, though rod 173 continues motion before reversal of its direction. Adjustment of initial position of collar 171 along rod 173, will determine the number of teeth the ratchet wheel 169 is advanced per stroke of rod 173, which in turn is determined by operation of cam shaft 79, and that would mean that ratchet wheel 169 is advanced a fixed amount, each time a sheet from a particular bin pile is transported and laid on the delivery belt 56. Said valve means 157 and its actuating mechanism associated therewith, are positioned atop ceiling plate 31, if desired.

As the conveyor belt 56 moves (see Figs. 15 and 16), the set of collated sheets at its extreme right, is shifted upon the stripper plates 182 extending from the delivery table 85, and said set of sheets comes between the stationary fingers 105 and their related gripping fingers 106, which sets of fingers are on the carriage 103; all gripper fingers extending laterally from a shaft 185, which is oscillatably mounted through the end plates 186 of said carriage. An arm 196, extending laterally from said shaft 185, is adapted to be intercepted near the limits of travel of the carriage 103, by the adjustable fixed stops 187 and 188 (see Fig. 1), to turn shaft 185 (see Figs. 17 and 18) so that blocks 189 and 190 are shifted beyond dead-center alignment; block 189 being carried on said shaft, and block 190 being pivotally mounted at 191 to an end plate 186; a pair of such associated blocks being provided on each such end plate if desired. Each of said blocks are provided with a socket to house the ends of a freely suspended compression coil spring 192; one such spring for each pair of associated blocks 189 and 190. Adjustably positioned screws 193 and 194, act as stops to control extent of block movement.

The sheet jogging device 107 (see Figs. 1, 2 and 19), is mounted around an opening 196 in table 195, above the platform 108. A pair of spaced parallel racks 197 and 198, are part of a frame 199, which is slidably mounted on a bracket 200. Another pair of spaced parallel racks 201 and 202, are part of a frame 203, which is slidably mounted on a bracket 204; all rack teeth being positioned vertical. The teeth of rack 197, face and are spaced from those of rack 201, also, the teeth of rack 198, face and are spaced from those of rack 202. A wide faced gear 205, rotatably mounted on fixed vertical stud 206, is positioned between and engages the racks 197 and 201. Another wide faced gear 207, rotatably mounted on fixed stud 208, is positioned between and engages the racks 198 and 202. The movement of all the racks is along the length of the machine. Frame 199 carries plate 145 between the racks on said frame. Frame 203 carries plate 147 between the racks said frame has. Plates 145 and 147 are positioned so that their opposed faces are vertical and parallel. The aligned racks 209 and 219, mounted for slidable movement on the brackets 220 and 221, along a line perpendicular to the direction of movement of the other racks of said jogging device, respectively engage the gears 205 and 207, and lie above the other racks. The rack 209 carries plate 144, and rack 219 carries plate 146, so that the opposed faces of said plates are vertical and parallel, but perpendicular to the opposed faces of the jogger plates 145 and 147. It is to be noted that the limit of inward movement of opposed jogger plates shall determine the sides of the final pile on platform 108. Each of the jogger plates is provided with a slotted arm and associated fastening screw so that their initial position may be adjusted on their respective carrying members, as is indicated by the numerals 210 and 211, to represent one such slot and retaining screw, respectively.

Also, if desired, the inward faces of the respective jogger plates may be provided with nozzle openings 212 of passages communicating to receive an air supply through the respective hose lines 213. A crank 214 on shaft carrying the gear 215, by means of a connecting rod 216, is adapted to impart a reciprocatory motion to the frame 199, whereby gears 205 and 207 will be oscillated about their respective axes, and hence all the jogger plates 144, 145, 146 and 147, will have a reciprocatory movement. The gear 215, (see Fig. 1) through gear box or other suitable gearing system indicated as 217, is driven from shaft 218, which in turn is driven by motor 225.

During operation of the machine, platform 108 having the final pile thereon, (see Fig. 1) is slowly lowered. Electric motor 225 is provided with control means (not shown) adapted for fine speed adjustment. A shaft 226, carries a pair of pulleys 227, in the belt groove of each of which is secured an end of a suitable cable 222; the other ends of said cables, being respectively secured at opposite points as 223. Each of these cables, passes under and supports a pair of platform pulleys 129. When shaft 226 revolves so that cables 222 are unwound from off the pulleys 227, the platform 108 will be lowered.

For a driving connection, (see Fig. 19) shaft 224 carries a wheel 228 which is in engagement with a worm 229 on shaft 218. Also, said shaft 224 carries a wide faced spur gear 230 in engagement with a gear 231 on shaft 226. This shaft 224, is slidably mounted through a bracket 232 fixed to the frame of the machine, and is maintained so positioned by coil spring 233 thereon between bracket 232 and handwheel 234 on said shaft, whereby worm 229 and wheel 228 are in engagement. When said handwheel carried on the slidably mounted shaft 224, is pushed inward causing disengagement of wheel 228 from the worm 229, and then said handwheel 234 is manually turned, the platform 108 is raised. Release of said handwheel, effects re-engagement of said worm and wheel.

For operation, as to each bin, (see Fig. 3) the bin platform 32, is lowered by manually pushing the related handwheel 45, inward, so that worm 44 and wheel 38 are in engagement. The said handwheel 45 is now manually rotated in proper direction to lower the platform 32 until it rests on the stops or cross pieces 41.

Considering a set to consist of six collated sheets, as an example of desired machine performance, then onto the respective bin platforms 32, shall be placed piles of identical sheets respectively, in the following relation. Onto the platform 32 which is at the extreme left of the machine in Fig. 1, is placed a pile of sheets which are to constitute the sheets which respectively are the bottom sheet of the sets formed. Onto the bin platform 32 which is second from the left, is placed a pile of sheets, which respectively are to be the sheet positioned in the respective sets, immediately atop the bottom sheet. Onto the bin platforms 32 respectively, third, fourth, fifth and sixth from the left, are placed piles of sheets, which respectively are to be in like relation in the respective sets to be formed counted from the bottom of the set. Of course, valve means 157 is not included in this set up; the air piping system being as shown in Fig. 10, with all valves 134, 135, 136 and 137 set by hand to open condition. The paper piles on the bin platforms 32 are respectively positioned to contact the plate 47 and the associated side guide bar 49; all sheets of the piles respectively being in register.

Figure 6:
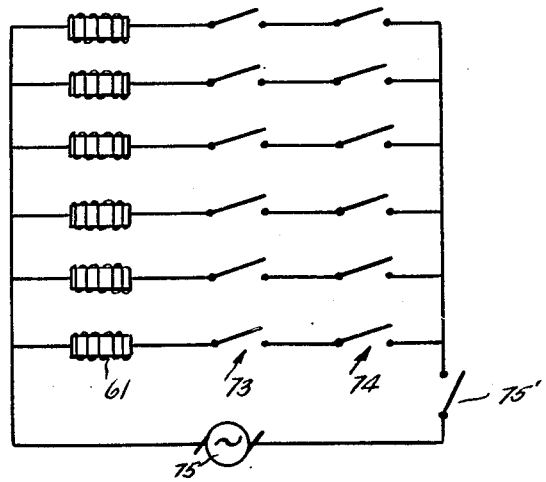
Fig. 6 shows a wiring diagram of the electrical circuit which may be employed for control and operation of the platform raising devices of the entire machine.

Each bin platform 32 (see Fig. 3) carrying a pile of sheets thereon, is now manually raised, by pushing the related handwheel inward as before, but turning same in reverse direction, until (see Fig. 4) the top sheet of each pile contacts its related feeler arm 71, and then a little more so that said feeler arm be a bit off dead center vertical, and the top of the pile be below proper bin paper level. The switch 75', referring to the circuit shown in Fig. 6, is closed, so that the automatic platform raising apparatus shown in Fig. 5, shall operate as to each of the bins, whereby the respective bin pile platforms 32 shall be automatically raised until the respective bin paper piles reach proper bin paper level.

Next, the final pile receiving platform 108 (see Fig. 1) is properly positioned to ride on cables 222 and within vertical track means (not shown), and raised (see Fig. 19) by pulling handwheel 234 outward and turning said handwheel in proper direction, until platform 108 is slightly below the jogger plates of device 107. The handwheel is now let go, whereupon wheel 228 and worm 229 come into engagement. Motor 225 (see Fig. 1) is let run, to accomplish slow descending of the platform 108, and the short range reciprocation of the respective jogger plates 144, 145, 146 and 147.

Now consider machine condition, where all the rams 53 are out of their related air cylinders 50, whereby all sucker cups 55 of the several sheet transporting means 48, are in their most forward position over the delivery belt 56. At this time, rack ram 87 is innermost within its cylinder 86, and in engagement with gear 99, because jack 100 is operated whereby its head 102 has accomplished and maintains such engagement. Ram 83 is outermost of its air cylinder 84, at which time, cam 78 permits the lowest position of cylinders 50. Carriage 103, because ram 112 is now outward of its air cylinder 109, is positioned substantially to the right of the jogging device 107, with fingers 105 and 106 in open relation. Also at this time, the timing mechanism is so arranged that valve 152, permits no sucking action at the sucker cups 55.

With the entire machine now in working order and in operation, and the timing device controlling solenoid valve operation in proper timed relation, so that now the respective air cylinders be operated, whereby the sheet transporting devices 48 travel into the bins, valve 152 is operated to create sucking action at the cups 55, whereby the respective top sheets from off the bin piles are attracted thereto; operation of cam shaft 79 being so timed as to properly raise and lower the sucker cups 55. During motion of the transporting devices towards and into the respective bins, rack ram 87 travels outward of its air cylinder 86, causing the top of the delivery belt 56 to be shifted one bin position to the right, and operation of air cylinder 109, causes movement of carriage 103 to the left and the closing of the fingers 105 and 106, to grip between them any sheets transported from off said belt onto the stripper fingers or plates 182; such gripped sheets to be released upon movement of carriage to the right, and let fall between the jogger plates of the device 107, to be aligned and form a pile atop platform 108.

Now, during movement of the sheet transporting devices 48 outward over the delivery belt 56 (see Fig. 3), the sheets held by the sucker cups 55 will be carried atop the said belt 56, and held down thereon due to the air issuing from the nozzles 153 of the overhead pipe 143. In the meantime, the cylinder 84 has been operated to turn the cam shafts 79 and 80 in reverse direction, permitting and causing the properly timed lifting and lowering of the sucker cups 55. When the top sheet is lifted off the bin sheet pile, any lower sheet adhering thereto, is stripped therefrom due to fluttering at the sheet edges caused by air jets at 76 and tripping action at stripper spring fingers 77.

As soon as the sheets are on belt 56, with the respective transporting means in outermost position, sucking action at the sucker cups 55 is made to cease by control of valve 152 by the timing means 154, whereby such transported sheets are freed of the sucker cups and their forward ends let fall. With repetition of the cycle which includes a shifting of the delivery belt 56 one bin position to the right, it is evident that piles are progressively formed with full set of collated sheets completed at the remote right bin position, for reception upon the next shifting of the delivery belt 56, by the fingers 105 and 106 on carriage 103, for transportation through the jogging device and onto the final pile on platform 108.

During movement of the sheets from the several bins onto the delivery belt 56, air is cut off from the jack 100 (see Fig. 1), causing its head 102 to fall, and thereby cylinder 89 will swing downwardly resting atop said head, whereby rack 87 becomes disengaged from gear 99 and retracted into its air cylinder 86, which is operated to do so during the forward stroke of the sheet transporting devices 48.

It is evident that the first five piles received by the carriage and deposited onto the platform 108, are incomplete sets, but that the sixth and all subsequent piles received by the carriage from off the delivery belt 56, are respectively sets of properly collated sets. Hence the bottom 15 sheets on the final pile are discarded. This is necessary only at initial set ups of the machine. It may be necessary that at initial set ups, the top sheet of the second bin pile, the uppermost two sheets of the third bin pile, the uppermost three sheets of the fourth bin pile, the uppermost four sheets of the fifth bin pile and the uppermost five sheets of the sixth bin pile, shall be blanks, if sets are numbered.

If it is desired that between a predetermined number of sets of collated sheets on the final pile on platform 108, there should always be a cardboard, or backing sheet of other suitable material, the first bin to the left used in any operation of the machine, shall be for housing a pile of cardboard sheets to be transported one at a time as is determined by operation of a valve means 157 (see Fig. 11) interposed to control the rear port of the air cylinder used for the operation of the transporting means 48 associated with the bin storing said cardboard pile. The rod 173 may be graduated as at 236, to indicate the frequency of a cardboard ejection, in relation to the number of sets of collated sheets formed on the delivery belt 56; such graduations serving for the proper locating of the position of collar 171 on said rod 173.

The machine of course may be used to form sets of collated sheets; each set consisting of less than the greatest capacity of the machine, that is, such sets may be comprised of either two, three, four or five sheets each, and said sheets may be of different character as to material, as for instance, writing paper, tissue paper, carbon paper, cardboard or other suitable material in sheets capable of being carried by the sucker cups 55. The manner of operation of less than all the bin sheet transporting devices 48, by proper setting of the hand valves 134, 135, 136 and 137 (see Fig. 10), is apparent and easily varied. Also, depending upon the nature of the sheets to be dealt with, the sucking power of the respective cups 55 may be controlled by the hand set valves 237 which may be interposed in the pipe connections 149.

Should it be desired to have a machine for collating sheets into sets, each of which comprise so many sheets that it would be impractical to have the machine with all its bins in tandem or otherwise in side-to-side relation, it is advisable as shown in Fig. 21, to provide the bin structure with a pair of sheet pile platforms 238 and 239, one over the other in spaced relation, and with a pair of sheet transporting means indicated generally by the numerals 240 and 241 respectively akin to 48 shown in Fig. 3, having the respective sucker cups 242 and 244. The upper sheet transporting means 240 is carried on the ram 245 of air cylinder 246, while the lower sheet transporting means 241 is the terminus at the bottom of a lazy tongs 247. Also carried on the forward end of the ram 245 is a vertically positioned air cylinder 248, whose ram 249 is connected to the lazy tongs 247 at 250 which is the pivotal connection of the upper pair of links of said lazy tongs. The upper end of one of these links is pivotally secured to the bracket 251 at point 252, while the upper end of the second of said links is horizontally slidably mounted on said bracket along a slot or track 253. Each of the platforms 238 and 239 are provided on their underside with the apparatus hereinbefore described with reference to a bin platform 32, to independently control the movement of said bin platforms 238 and 239, along a single set of screw shafts not shown, which are akin to 33, as can be well understood in view of explanation hereinabove set forth. The air cylinder 246 is pivotally mounted at 254 and controlled by a cam 255 on the cam shaft, as previously indicated with respect to 78 and 79. Clearance space 256 need be provided between the bin structure and the delivery belt here shown as 257, to accommodate inclusion of additional structure which includes the lazy tongs 247 and the sheet transporting means 241.

Although not shown, it is well understood that the operation of the double acting air cylinder 248, is controlled by a solenoid operated valve of the type herein described, timed for operation by a cam included on shaft 155 and accompanying switch apparatus in the circuit of its solenoid.

For operation, timing is so accomplished that during movement of ram 245 into air cylinder 246, at the instant the lazy tongs 247 and all it carries is free for movement downward into the clearance space 256, the air cylinder 248 is operated whereby its ram 249 is pushed downward, whereby the lazy tongs 247 will expand downward thus lowering the sheet transporting means 241 with respect to the lower bin platform 239, as the upper sheet transporting means 240 is to the upper bin platform 238. Now cam 255 operates to effect entrance and thereafter withdrawal of the sheet transporting means 240 and 241 of the bin structure, during which the sucker cups 242 will have attached to themselves by suction, the top sheet on the sheet pile atop bin platform 238, and the sucker cups 244 will have attached to themselves by suction, the top sheet on the pile atop bin platform 239. Once all the sucker cups are again in the clearance space 256, the air cylinder 248 is operated that its ram 249 move upward, whereupon the lazy tongs 247 will collapse, and the two sheets being transported will be carried and let fall in superimposed relation onto the conveyor belt 257.

Any number or all of the bins of the embodiment shown in Fig. 1, may be provided with the structure shown in Fig. 21, and as any collating job may require, selected lower platforms 239 may have no paper pile thereon, all in accordance with requirements the machine may be called upon to perform.

In the embodiment shown in Fig. 1, and particularly referring to Fig. 3, the lifting and lowering of the sheet transporting means 48 during the latter's entrance and withdrawing from the bin, is effected by the action of cam 78 and as explained by the rocking the air cylinder 50 during movement of its ram 53. The same action may be accomplished by the modified embodiment illustrated in Fig. 22 and Fig. 23. Here air cylinder 258, akin to 50, is pivotally mounted at 259, and its ram 260 carries a structure indicated generally by the numeral 261, which carries the gear wheels 262 which ride along and in engagement with the racks 263 positioned over and across the delivery belt 264. Said structure carries a plurality of sheet conveying means 265, akin to 48; said racks 263 being pivotally mounted at 266 to the uprights 267. The other ends of said racks rest on cams 268 on a cam shaft 269, akin to 78 and 79, which cam shaft is operated as in Fig. 1. It is evident that as said racks 263 are rocked by the cams 268, so will the sheet transporting means 265 be raised or lowered; all components being so dimensioned as to acomplish the required scope of movement for proper transportation of sheets from the bins onto the delivery belt 264.

Proper guide and supporting rails or other suitable structure should be included where necessary for moving parts having a comparatively long range movement. Such however are well known in empirical mechanical design and have been omitted in the drawings for the sake of clarity of illustration of the pertinent mechanism.

This invention is capable of numerous forms and various applications without departing from the essential features herein disclosed. It is therefore intended and desired that the embodiment herein be deemed illustrative and not restrictive and that the patent shall cover all patentable novelty herein set forth; reference being had to the following claims rather than to the specific description herein to indicate the scope of this invention.

I claim:

1. In a collating machine, a plurality of platforms in side by side relation, each adapted to support an individual pile of paper sheets thereon, a conveyor means constantly presenting a sheet-receiving surface in front of all the platforms, means for transferring the top sheet of each of the respective piles onto the sheet-receiving surface of the conveyor means in equi-spaced relation, means for intermittently moving said sheet-receiving surface of the conveyor means in one direction, from the center line of one of the sheet positions thereon to the then center line of the adjacent sheet position thereon; the movement of said sheet-receiving surface of the conveyor means occurring after each time a sheet from all of the respective piles are deposited thereon; said moving means including a revolvably mounted shaft adapted upon rotation thereof to move said sheet-receiving surface of the conveyor means, a gear carried on said shaft, a first air cylinder means having a slidable piston therein and a port at each end thereof, a piston rod extending from said piston outwardly of said first air cylinder, said first air cylinder being moveably mounted, a rack carried on said piston rod; the rack being in engagement with said gear, a first valve means for directing compressed air into said ports alternately, means to move said first air cylinder to a position whereby the rack is out of engagement with said gear; such means comprising a second air cylinder having a slidable piston means therein, a member extending from the piston means in the second air cylinder outwardly of said second air cylinder, adapted upon movement of the piston means within the second air cylinder in one direction, to shift the rack into engagement with said gear, and upon movement thereof in opposite direction, to move said rack out of engagement with the gear, a second valve means to control the operation of the second air cylinder and means to operate both valve means and the top-sheet transferring means, in predetermined timed relation.

2. In a collating machine, a plurality of platforms in tandem relation, each adapted to support an individual pile of paper sheets thereon whereby such piles shall be in equi-spaced relation, an endless belt positioned in front of all the platforms, a pair of spaced pulleys in substantially horizontal position; the belt being mounted on said pulleys, a plurality of suction devices for transferring the top sheet of each of the respective piles onto said belt in equi-spaced positions thereon, means for intermittently moving said belt over the pulleys in one direction, from the center lines of one of the sheet positions thereon to the then center line of the adjacent sheet position thereon; said means including a revolvably mounted shaft, adapted upon rotation thereof to move said belt over the pulleys, a gear carried on said shaft, a first air cylinder means having a slidable piston therein and a port at each end thereof, a piston rod extending from said piston outwardly of said first air cylinder; said first air cylinder being movably mounted, a rack carried on said piston rod; the rack being in engagement with said gear, a first valve means for directing compressed air into said ports alternately, means to move said first air cylinder to a position whereby the rack is out of engagement with said gear; such means comprising a second air cylinder having a slidable piston therein; a member extending from the piston in said second air cylinder outwardly from said cylinder, adapted upon movement of the piston within the second air cylinder in one direction, to shift the rack into engagement with the gear, and upon movement thereof in the opposite direction, to move said rack out of engagement with said gear, a second valve means to control the operation of the second air cylinder and means to operate the sheet transferring devices and both said valve means in predetermined timed relation.

3. In a collating machine, a plurality of platforms in side by side relation, an additional platform positioned with respect to one of the other platforms whereby such pair of platforms are one above the other; each of the platforms being adapted to support an individual pile of paper sheets thereon, a conveyor means constantly presenting a sheet-receiving surface in front of all the platforms, means for intermittently moving said sheet-receiving surface of the conveyor means in one direction, from the center line of one of the sheet positions thereon to the then center line of the adjacent sheet position thereon, a plurality of suction devices for transferring the top sheet of each of the respective piles of said plurality of platforms onto the sheet-receiving surface of the conveyor means, air cylinder means having piston means slidably therein and extending outwardly thereof and a port at each end thereof, valve means for directing compressed air into said ports alternately; said suction devices being carried by the external portion of the piston means, whereby upon movement of the piston means within the cylinder means, the suction devices are moved to and from above the respective piles and above the sheet positions on the sheet-receiving surface of the conveyor means, an additional suction device for transferring the top sheet of the pile on the additional platform, onto the sheet-receiving surface of the conveyor means, a second air cylinder means having piston means slidably therein and extending outwardly thereof and a port at each end thereof, a second valve means for directing compressed air into the ports of the second cylinder means alternately, an extended lazy tongs mounted at one end thereof to the external portion of the piston means of the first air cylinder means and adapted to be operated by the piston means of the second air cylinder means; the additional suction device being carried on the other end of the lazy tongs and the second cylinder means being carried on the external portion of the piston means of the first air cylinder means, a third valve means for controlling the operation of the suction devices and means to operate all the valves and the means for moving the sheet-receiving surface of the conveyor means, in predetermined timed relation, whereby each of the top sheets from the piles on said pair of platforms are transferred onto the sheet-receiving surface of the conveyor means in superimposed relation on one sheet position thereon and the respective top sheets of each of the other piles on the other platforms are transferred onto said surface on separate sheet positions thereon during an interval while said surface is stationary.

4. In a collating machine, a plurality of platforms, each adapted to support an individual pile of paper sheets thereon, a conveyor means constantly presenting a sheet-receiving surface in front of all the platforms, means for intermittently moving said sheet receiving surface of the conveyor means in one direction, from the center line of one of the sheet positions thereon to the then center line of the adjacent sheet position thereon, a first suction device for transferring the top sheet of one of the piles onto said sheet receiving surface of the conveyor means on one sheet position thereon, a plurality of suction devices for transferring the respective top sheets of the remaining piles on said sheet-receiving surface of the conveyor means in separate positions thereon; said sheet positions on said surface being equi-spaced, a first air cylinder means having piston means slidable therein and extending outwardly thereof and a port at each end thereof, second air cylinder means having piston means slidable therein and extending outwardly thereof and a port at each end thereof; the first suction device being carried on the external portion of the piston means of the first air cylinder means and the remaining suction devices being carried on the external portion of the piston means of the second air cylinder means, whereby upon movement of the piston means within the respective air cylinder means, the suction devices are moved to and from above the respective piles and above the sheet positions on the sheet-receiving surface of the conveyor means, valve means for directing compressed air into the ports of the first air cylinder means alternately and into the ports of the second air cylinder means alternately, a second valve means for controlling the operation of the suction devices, a third valve means interposed in the pipe connecting the first valve means and one of the ports of the first air cylinder means, means to operate the third valve means and means to operate all the valve means and the third valve operating means and the means for moving the sheet-receiving surface of the conveyor means, in predetermined timed relation and so that the third valve means is in open condition once for a predetermined plurality of times the other valve means are in open condition.

5. A collating machine as defined in claim 4, wherein the third valve means comprises a casing having a rotor chamber, a rotor member rotatably housed in said chamber; said rotor member having an aperture therethrough and said casing having a pair of ports positioned in the path of said aperture whereby at a particular position of the rotor member, said aperture is in communication with both said ports, a ratchet wheel carried by the rotor, a moveably mounted pawl adapted to be moved between determined limits to engage the ratchet wheel and move same a predetermined portion of a revolution and means to move the pawl between said limits and wherein the timing means is adapted to control the operation of the pawl moving means; one of the ports of said casing being communicative with one of the ports of the first air cylinder means and the other port of said casing being communicative with the first valve means.

6. In a collating machine, a plurality of platforms, each adapted to support an individual pile of paper sheets thereon, a conveyor means constantly presenting a sheet-receiving surface in front of all the platforms, means for intermittently moving said sheet-receiving surface of the conveyor means in one direction, from the center line of one of the sheet positions thereon to the then center line of the adjacent sheet position thereon, a plurality of suction devices for transferring the top sheet of each of the respective piles on said sheet-receiving surface of the conveyor means, air cylinder means swingably mounted on a horizontal axis; said air cylinder means having piston means slidable therein and extending outwardly thereof and a port at each end thereof, valve means for directing compressed air into said ports alternately; said suction devices being carried by the external portion of the piston means, whereby upon swinging movement of the cylinder means and reciprocating movement of the piston means within the cylinder means, the suction devices are moved to and from above the respective piles and above the sheet positions on the sheet-receiving surface of the conveyor means, a second valve means for controlling the operation of the suction devices, a stripper member positioned above a pile, adapted soon after commencement of movement of the top sheet of said pile by the suction means and upon upward movement of the cylinder means, to be contacted by the edge of said sheet; said edge being that nearest the sheet-receiving surface of the conveyor means, a moveably mounted cam means adapted upon movement thereof to swing said cylinder means between determined limits and means to operate both said valve means, the cam means and the means for moving the sheet-receiving surface of the conveyor means in predetermined timed relation.

7. In a collating machine, a plurality of platforms, each adapted to support an individual pile of paper sheets thereon, a conveyor means constantly presenting a sheet-receiving surface in front of all the platforms, means for intermittently moving said sheet-receiving surface of the conveyor means in one direction, from the center line of one of the sheet positions thereon to the then center line of the adjacent sheet position thereon, a plurality of suction devices for transferring the top sheet of each of the respective piles on said sheet-receiving surface of the conveyor means, air cylinder means swingably mounted on a horizontal axis; said air cylinder means having piston means slidable therein and extending outwardly thereof and a port at each end thereof, valve means for directing compressed air into said ports alternately; said suction devices being carried by the external portion of the piston means, whereby upon swinging movement of the cylinder means and reciprocating movement of the piston means within the cylinder means, the suction devices are moved to and from above the respective piles and above the sheet positions on the sheet-receiving surface of the conveyor means, a second valve means for controlling the operation of the suction devices, a stripper member positioned above a pile, adapted soon after commencement of movement of the top sheet of said pile by the suction means and upon upward movement of the cylinder means, to be contacted by the edge of said sheet; said edge being that nearest the sheet-receiving surface of the conveyor means, a gear rotatably carried on the external portion of the piston means, a rack swingably mounted on a horizontal axis and having upwardly extending teeth positioned across the sheet-receiving surface of the conveyor means; said gear being in engagement with said rack teeth, a moveably mounted cam means adapted upon movement thereof to swing said rack between predetermined limits and means to operate both said valve means, the cam means and the means for moving the sheet-receiving surface of the conveyor means in predetermined timed relation.

CHARLES L. LEIFER.

REFERENCES CITED

The following references are of record in the file of this patent:

UNITED STATES PATENTS

| Number | Name | Date |
|---|---|---|
| 588,635 | Dexter | Aug. 24, 1897 |
| 845,369 | Murray | Feb. 26, 1907 |
| 921,983 | Hanson | May 18, 1909 |
| 1,090,473 | Gullberg et al. | Mar. 17, 1914 |
| 1,378,886 | Maineri | May 24, 1921 |
| 1,871,707 | Klupmeyer et al. | Aug. 16, 1932 |
| 1,999,953 | Barennes | Apr. 30, 1935 |
| 2,174,569 | Dinzl | Oct. 3, 1939 |
| 2,225,007 | Gudger | Dec. 17, 1940 |
| 2,295,055 | Rupp et al. | Sept. 8, 1942 |
| 2,295,073 | Blythe et al. | Sept. 8, 1942 |
| 2,362,134 | Honig | Nov. 7, 1944 |
| 2,373,746 | Dager | Apr. 17, 1945 |
| 2,393,254 | Leifer | Jan. 22, 1946 |